Feb. 27, 1968 SHINGO HAGIHARA ETAL 3,370,798
CENTERLESS WINDER
Filed Oct. 27, 1964 6 Sheets-Sheet 1

SHINGO HAGIHARA
YASUTAKE KOBAYASHI
KATSUMI HASEGAWA, AND
AKIO ANDO

INVENTORS

BY *Wenderoth, Lind & Ponack*

ATTORNEYS

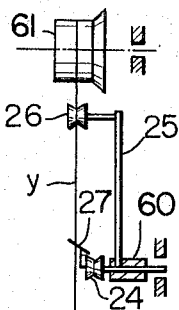
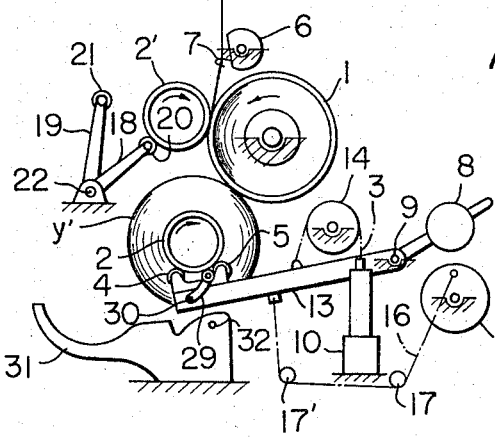
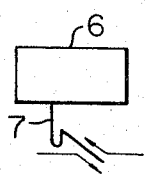
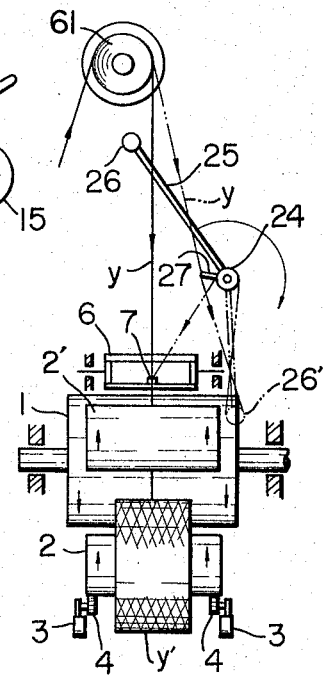
Fig. 3
Fig. 4
Fig. 5

Feb. 27, 1968   SHINGO HAGIHARA ETAL   3,370,798
CENTERLESS WINDER
Filed Oct. 27. 1964   6 Sheets-Sheet 4

SHINGO HAGIHARA
YASUTAKE KOBAYASHI
KATSUMI HASEGAWA, AND
AKIO ANDO
INVENTORS

BY Wenderoth, Lind and Ponack
ATTORNEYS

Feb. 27, 1968  SHINGO HAGIHARA ET AL  3,370,798
CENTERLESS WINDER
Filed Oct. 27, 1964  6 Sheets-Sheet 6
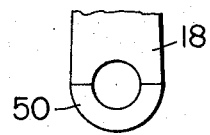
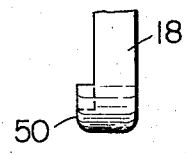
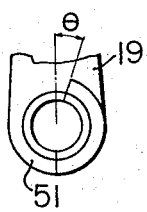
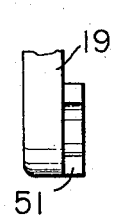
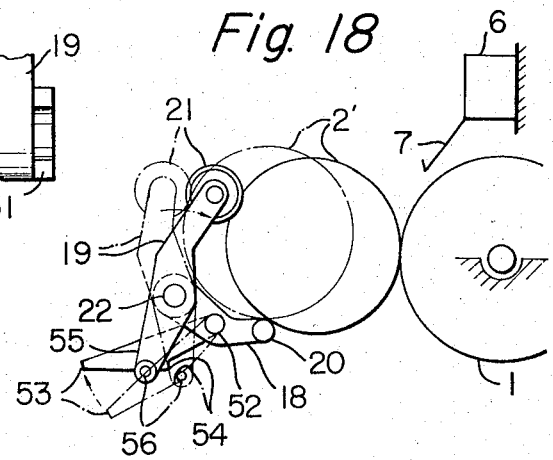
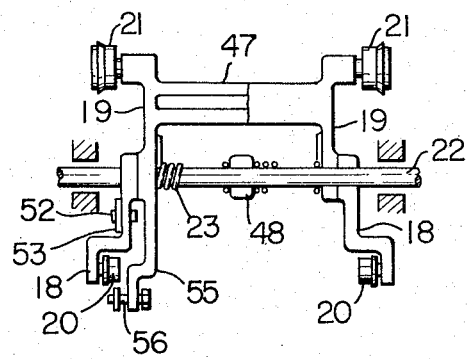
SHINGO HAGIHARA
YASUTAKE KOBAYASHI
KATSUMI HASEGAWA
AND AKIO ANDO
INVENTORS
BY Wenderoth, Lind
and Ponack
ATTORNEYS

United States Patent Office 3,370,798
Patented Feb. 27, 1968

3,370,798
CENTERLESS WINDER
Shingo Hagihara, Yasutake Kobayashi, Katsumi Hasegawa, and Akio Ando, Ohtsu-shi, Japan, assignors to Toyo Rayon Kabushiki Kaisha, Muromachi, Chuo-ku, Tokyo, Japan
Filed Oct. 27, 1964, Ser. No. 406,775
Claims priority, application Japan, Feb. 17, 1964, 39/8,159; May 20, 1964, 39/28,142; Aug. 11, 1964, 39/44,741
6 Claims. (Cl. 242—18)

This invention relates to a centerless winder. More particularly, the invention relates to a centerless winder wherein, in exchanging a full-wound drum for an empty drum and switching the yarn to the new-drum in a centerless winder for yarns, not only is the switching of the yarn smoothly carried out by imparting preparatory rotation to the empty drum but also the full-wound drum is ejected from the winder.

Lately, in concomitance with an improvement in the productivity of fibers, the rate at which the fibers are spun is increasingly attaining higher speeds, the rate reaching as high as 1000 to 2000 meters per minute. In consequence, the operations of handling the yarns such as, for example, their windup or switching is frequently attended with difficulties.

Heretofore, in the step where the textile filaments that are being delivered continuously via the spinning step are wound up on drums, the operation of switching the filaments from a full-wound drum to a new drum was carried out manually in practically all cases. Moreover, considerable time was required in the past for exchanging the drums in the conventional winders. Hence, in the case where this type of winder was employed in a large number of spindles, there was the drawback that the amount wound up on the drums would vary with respect to the several spindles, because of the fact that this operation was being carried out by a limited number of workers. Further, there was a tendency that the difference in amount wound up between the maximum and the minimum would become greater as the windup speed became higher or as the number of spindles increased.

Further, considerable danger is involved in carrying out manually the exchange operation of a yarn winder operating at high speeds, such as hereinabove noted. In addition, a long period of time was also required in removing and installing the windup drums in the conventional apparatus. Thus the improvement in the productive efficiency was also limited.

An object of the present invention is to provide a centerless winder wherein the drawbacks of the conventional apparatus having been eliminated the operation of exchanging the windup drums is carried out smoothly and readily in a short period of time without lowering the production.

Another object of the invention is to provide a centerless winder by which labor can be saved and the operation of which is very safe and furthermore the productive efficiency of which far surpasses that of the conventional apparatus.

A further object of the invention is to provide a centerless winder in which the operations of winding up the yarn and exchanging of the drums can be automatically controlled, with the consequence that the control of the windup of a fixed amount of yarn on the drums can be readily accomplished.

Namely, the present invention is directed to a centerless winder having at least two drum receiving rolls which support the ends of a windup drum winding up a yarn while receiving a surface drive by means of a driving roll and windup drum supporting arms capable of freely moving to-and-fro in the direction of the driving roll, whereby the windup of a yarn is carried out by the windup drum being pressed with suitable force against said driving roll by means of drum receiving rolls. Further, for facilitating the automation of said centerless winder, the aforesaid mechanism is further provided with empty drum supporting arms having at their ends drum receiving rolls for supporting an empty drum and which arms are oscillatable about a pivotal point, said empty drum supporting arm being so adapted to be rocked prior to the time of the exchange of the full-wound drum for an empty drum, to effect the contact of the empty drum with the driving roll thereby imparting preparatory rotation to said empty drum; further, the windup drum supporting arms are so adapted that after completion of the switching of the yarn by means of a yarn severing means from the full-wound drum to the empty drum which is being driven as hereinbefore noted, said arms recede from the driving roll to discharge the full-wound drum, after which they return to support the new windup drum in its proper winding up position.

The foregoing windup drum supporting arms may have at least two drum receiving rolls at its one end and be pivotally supported so as to be capable of oscillating movements thereabout. Alternatively, the foregoing windup drum supporting arms may have at least two drum receiving rolls and be mounted on an ascending and descending means capable of movements in the up-and-down direction.

Preferably, the windup drum supporting arms are of such a design that they consist of main arms which may or may not have at their one ends drum receiving rolls and by being oscillatable about their pivotal points adjust the surface pressure between the driving roll and the windup drum, and auxiliary arms pivotally mounted to said main arms so as to be capable of oscillating movements, said auxiliary arms, which may or may not have drum receiving rolls, being so adapted that they are pushed upwardly when the main arms descend thereby to oust the full-wound drum from the supporting arms. While it is necessary in this case for the windup drum supporting arms to be provided with at least two drum receiving rolls, these receiving rolls may be either provided in such a fashion that they are distributed between the main and auxiliary arms or wholly on either the auxiliary arms or the main arms.

The foregoing empty drum supporting arms preferably consist of pushing-in arms rotatably mounted on a rotating shaft and switching arms mounted fixedly on the foregoing rotating shaft, both of which arms are provided with drum receiving rolls at their distal portions. The pushing-in arms are preferably of a design such that they are subjected to a pulling force by which they are constantly biased towards the switching arms and adapted, in concomitance with the rotation of the switching arms as a result of the rotation of the rotating shaft, to press against the driving roll the empty drum which they are supporting.

Further, preferably the aforesaid pushing-in arms have at their one end drum receiving rolls and at their other end projecting pins, while the switching arms are provided with engaging arms which are attached by means of pins so as to be rotatable and have fingers cut out therein which are adapted to come into engagement with the projecting pins of the foregoing pushing-in arms thereby preventing the tendency to close the angle at which the two arms are open and to maintain this angle constant. Namely, by doing this, it becomes possible when the windup drum becomes fully wound and the empty drum is to be given its preparatory rotation, to kick up the engaging arm provided with the finger by means of a magnet and disengage the pin from the finger, with the consequence that the pushing-in arms are rotated towards the switching arms by means of a pulling force to push forward the empty drum to the driving roll as well as to bring the drum receiving rolls into pressing contact with the empty drum.

The lowering of the windup drum supporting arms for ejecting the windup drum can be accomplished by an operation of depressing pedal or by using in conjunction a power source and a crank plate. Alternatively, this may be accomplished by the employment of hydraulic or pneumatic means. When the latter means are used, it becomes possible to operate all the spindles simultaneously and automatically. Further, it is possible to bring all the the operations completely under automatic control by coupling the foregoing operation with the other operations of the present apparatus.

A more complete understanding of the invention will be had by reference to the accompanying drawings, wherein:

FIGS. 3 and 4 are respectively side and front views for explaining the yarn exchanging operation in said embodiment.

FIG. 5 is a top plan view of a yarn traverse device.

Figure 8A:
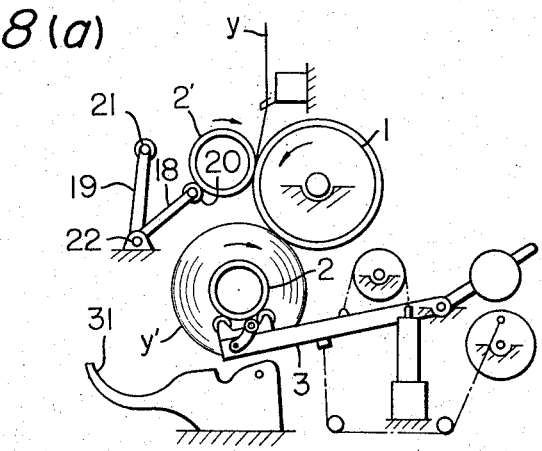

FIGS. 8a, b and c are views for explaining the operational movements of the apparatus.

Figure 9:
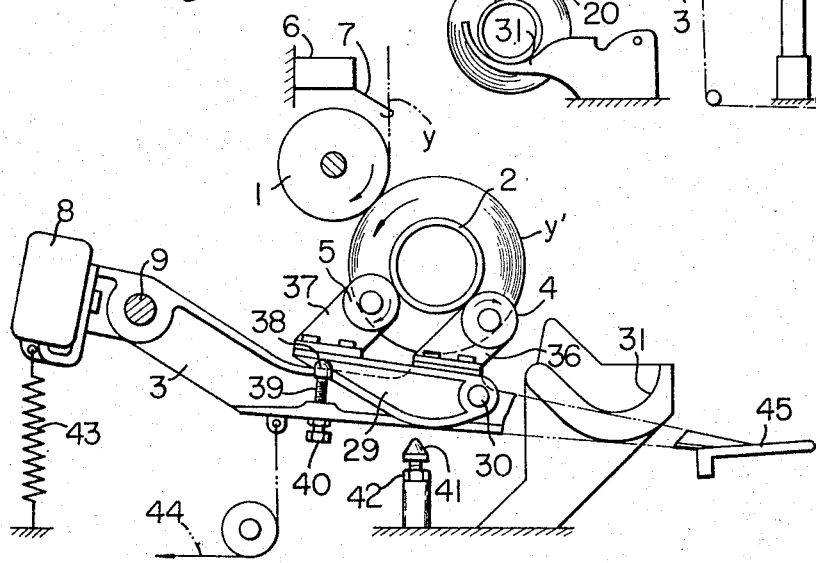

FIG. 9 is a side view illustrating another embodiment of the windup drum supporting arms of the invention.

Figure 10:
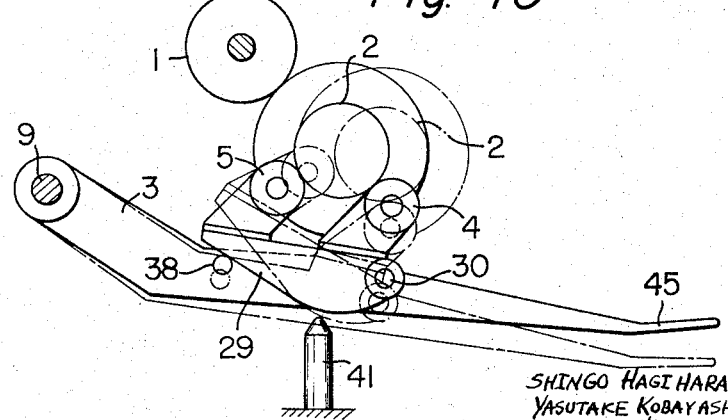

FIG. 10 is a view for explaining the operations of the foregoing apparatus.

Figure 11:
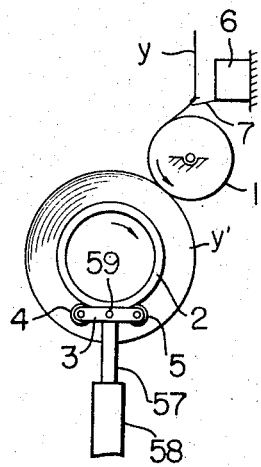

FIG. 11 is a side view illustrating another embodiment of the empty drum supporting arms.

Figure 12:
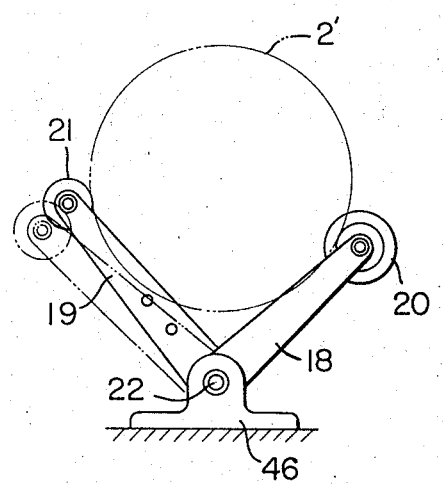
Figure 13:
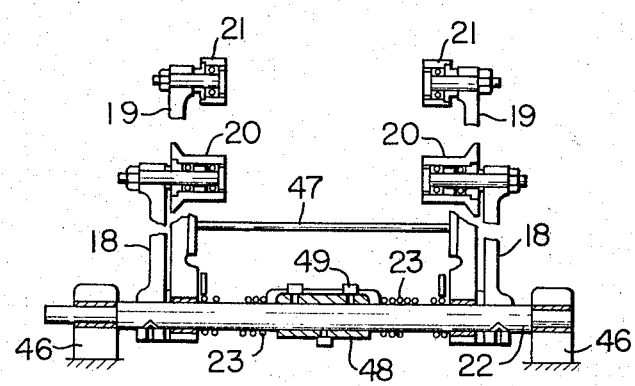

FIGS. 12 and 13 are side and front views illustrating still another embodiment of the empty drum supporting arms.

FIGS. 14 and 15 are front and side views of the bearing portion of the switching arms.

FIGS. 16 and 17 are front and side views of the bearing portion of the pushing-in arms.

FIGS. 18 and 19 are a side view and a front view partly in section of further embodiment of the empty drum supporting arms of the apparatus.

An embodiment of the invention is described in detail below, reference being had to the accompanying drawings.

Figure 1:
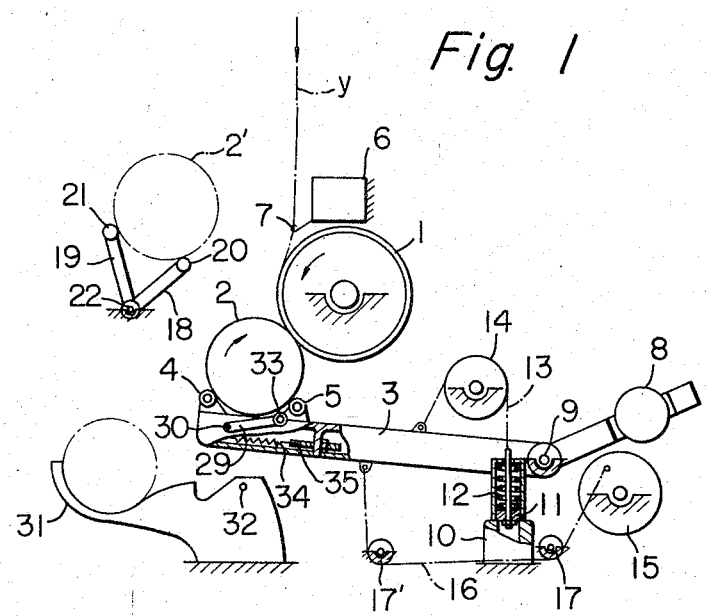
FIGS. 1 and 2 are side and front views partly broken away illustrating one embodiment of the invention apparatus.
Figure 2:
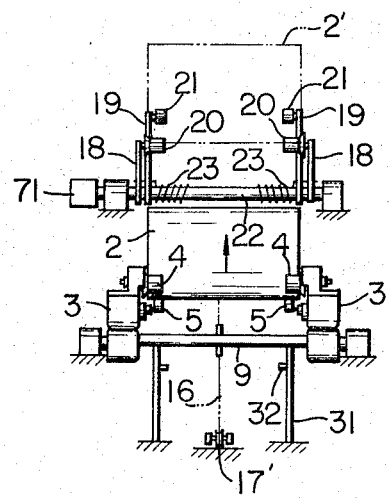

FIGS. 1 and 2 are views showing the overall apparatus according to the invention. Reference numeral 1 is the driving roll which is rotating at a constant speed whereby it drives the surface of a windup drum 2. Windup drum 2 rotates on top of drum receiving rolls 4 and 5 which are mounted rotatably at one end of windup drum supporting arms 3. Yarn y is wound up on the windup drum 2 while being caused to move across the drum by means of guide 7 disposed at the extremity of yarn traverse device 6. Supporting arms 3 by being provided at their other ends with weights 8 are adapted to apply a pressure by way of fulcrum point 9 such that a contact between the driving roll 1 and windup drum 2 is effected with a suitable force. Further, 10 is an oil-filled cylinder having a piston 11 which slides therein with a coil spring 12 intervening. The piston, at its end, is connected to a chain 13 which, in turn, is connected to supporting arms 3 via guide roll 14. This serves as a surface pressure compensator for ensuring that a desirable surface pressure is maintained even though there occurs a gradual change in the surface pressure due to the increasing weight of the yarn as it is being wound up on the windup drum.

Further, piston 11 by being drilled with small holes enabling the oil to pass upwardly or downwardly in the cylinder is provided with a shock-absorbing effect against such movements as when supporting arms 3 attempt to make an abrupt descent as a result of extraordinary disturbances. 15 is the crank plate provided with a quick-return means and it comprises a chain 16 attached at a radially located point, which chain at its other end is connected to supporting arms 3 via guide rollers 17 and 17', whereby the supporting arms are made to make up-and-down oscillating movements.

On the other hand, 2' is the empty drum which being carried by the empty drum supporting arms stands by to replace the drum presently being wound when the latter reaches its full-wound state. The empty drum supporting arms are made up of drum switching arms 18 and drum pushing-in arms 19, both of which are provided at their distal portions with drum receiving rolls 20 and 21. Drum switching arms 18 and which are fixedly secured to a rotating shaft 22 are provided with fingers by which the rotation of the pushing-in arms 19 are regulated so that they can turn only through a certain angle. Thus, the pushing-in arms 19 are mounted rotatably on shaft 22. And these drum pushing-in arms 19 are pressed towards the side of drum switching arms 18 by means of torsional coil spring 23. Shaft 22 is engaged with motor 71 (FIG. 2). In response to the signal sent to the motor 71, the motor 71 is rotated, and accordingly the shaft 22 is rotated. The empty drum supporting arms while carrying an empty drum on their drum receiving rolls 20 and 21 stand by until the time for exchanging the full-wound drum for the empty drum. Torsional coil springs 23, hereinafter described, by inclining arms 18 and 19 serve the purpose of causing the empty drum to be given a preparatory rotation by means of driving roll 1 and pressing the empty drum continuously with a uniform force during the switching operation of the drums.

FIGS. 3 and 4 illustrate the switching operation in the hereinabove described apparatus. When windup drum 2 is winding up a filament approaches its full-wound state, shaft 22 of the arms supporting the empty drum 2' makes a slight rotation, with the consequence that the empty drum which the arms were carrying is dropped against driving roll 1 and starts its preparatory rotation. Shaft 22 stays stopped for a while in the state shown in FIG. 3 and yarn y still continues to pass under the empty drum 2' and to be wound on the windup drum 2. Then when the preparatory rotation of the empty drum reaches its full speed, the switching of the yarn, i.e., switching of the yarn from full-wound drum 2 to empty drum 2', is carried out either in accordance with a pre-established program or by manual operations.

Figure 6:
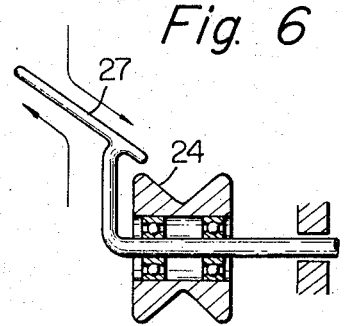
FIG. 6 is a view in vertical section of a guide roller.
Figure 7:
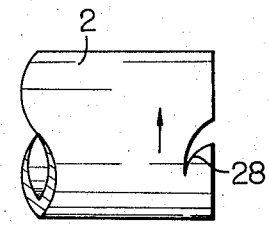
FIG. 7 is an elevation illustrating the end portion of a drum.

This yarn switching operation is accompished by the rotating movements of both the guide roller 24 which rotates with shaft 60 and the guide roller 26 which is attached to the distal portion of a guide bar 25 oscillates about the same shaft 60. Namely, when shaft 60 rotates either by means of a signal of an established program or by means of manual operation, guide arm 25 oscillates. At this instant, guide roller 26, while guiding yarn y moves to position 26' of FIG. 4. Yarn y being guided by guide 27 mounted on guide roller 24 slips onto guide roller 24 (see FIG. 6). The locus of the yarn at this instant becomes as indicated by y in FIG. 4. When this state is reached, the yarn positioned at 26' of the guide roller comes in contact with incised portion 28 provided at the end of the empty drum 2' and is severed (see FIG. 7), and the winding of the yarn shifts from the full-wound drum 2 to the empty drum 2'. Then the yarn which has wound on to the new empty drum 2' hits guide 7 of the yarn traverse device and automatically gets picked up therein to be imparted its regular reciprocative traversing movements. Namely, the traverse guide 7, as shown in FIG. 5, is of such a design that a yarn coming from the drum end slips in without fail. For carrying out the yarn switching operation, the guide 27 fitted to guide roller 24 is shaped as shown in FIG. 6. Thus, the yarn that comes in contact with this guide from the upper direction slips into guide roller 24, while the yarn coming from the opposite direction is made to pass along the outside of guide roller 24. Again, the end portion of the drum for winding up the yarn has an incised portion 28 for severing the yarn, as shown in FIG. 7. Incised portion 28 is an incision which becomes narrower as it gets deeper for ensuring that the yarn caught therein is gripped with certainty. If the yarn does not become severed by just the shock when its gets caught in the drum end, a yarn cutting knife may be provided where the empty drum makes its preparatory rotation, which knife is to be operated only when a signal for its operation is transmitted using a device such as a solenoid, to sever the yarn as it comes around and becomes caught in the incision. Simultaneously, as the yarn is switched over to the new drum 2', crank plate 15 is actuated, with the consequence that chain 16 is pulled to lower windup drum supporting arms 3. When supporting arms 3 descend, they come to a point where auxiliary arms 29 having rolls at their tips which support the full-wound drum, hit pins 32 of drum receiver 31 to be thus pushed upwardly about their pins 30, with the consequence that the full-wound drum which had been supported is pushed upwardly and discharged onto drum receiver 31. Supporting arms 3, after having discharged the full-wound drum, are then raised by means of the quick-returning means to their topmost position, i.e., to the highest position possible, but such that they do not contact driving roll 1. This adjustment is accomplished at the crank portion 15.

Figure 8B:
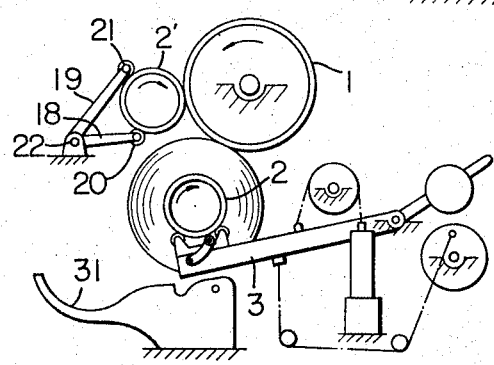
Figure 8:
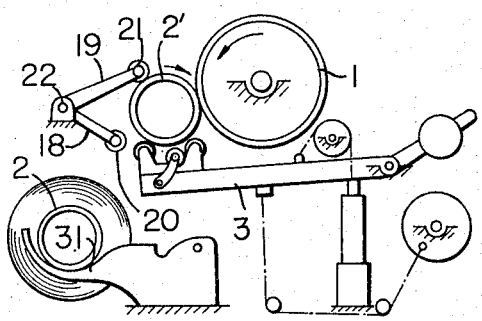

The operational movements of the apparatus when exchanging drums are shown in FIGS. 8. FIG 8a, which corresponds to the state shown in FIG. 3, illustrates the condition when empty drum 2' is being given its auxiliary rotation by its surface being driven. Meanwhile, rotating shaft 22 continues being turned until it reaches the position shown in FIG. 8b where it stops. At this position, empty drum 2' is supported and confined by the three rollers 1, 20 and 21 at three points. Thus, even though it is subjected to some external disturbances, the empty drum 2' which is being imparted preparatory rotation cannot possibly jump out from this position. Pushing-in arms 19 are in their open state at this position, since empty drum 2' is being pressed towards rotating shaft 22 by means of driving roll 1. As empty drum 2' is subjected at this position to the force of torsional spring 23, it is subjected to an outwardly pressing force. Hence, empty drum 2' being pressed against driving roll 1 with a suitable surface force can be driven perfectly.

Yarn y is switched as shown in FIG. 4, from full-wound drum 2 to empty drum 2' in this state, and, as hereinbefore noted, full-wound drum 2 is discharged onto drum receiver 31 by the oscillation of supporting arms 3. Supporting arms 3 then stand by at their topmost position to await the descent of a new drum 2' which is to be moved to its proper winding up position from the position of FIG. 8b where it is winding up the yarn, without disturbing its winding up operation. The shift from this state to the stroke shown in FIG. 8c is carried out by the resumption of the rotation by shaft 22 which had been standing still at the position shown in FIG. 8b, drum 2' descending along the surface of driving roll 1 while continuing its winding of the yarn which makes reciprocative movements across the drum. Drum 2' going through the state shown in FIG. 8c becomes established in the position of windup drum 2 of FIG. 1.

When drum 2' moves to the position of FIG. 8c, rolls 20 become disengaged from drum 2', and as a result drum 2' assumes the state where it is being pressed downwardly.

When moving from the state shown in FIG. 8c to that of FIG. 1, the provision of roll arms 29 is desirable.

Namely, roll arms 29 have fitted at their one end rolls 33, while at their other end are provided springs with pins 30 intervening. Thus, they function to push upwardly against the mounted drum (FIG. 1). Hence, if there were no roll arms 29 which were mounted rotatably about their pivotal points, i.e. pins 30, and were adapted to support the windup drum 2 by means of springs 34 or other means, there would be the possibility that there would be a period during which drum 2' when moving from the position of FIG. 8c to that of FIG. 1 is supported by only two rollers, i.e., the driving roll 1 and drum carrying rolls 4. In consequence, there would be the possibility, if only for a moment, in which drum 2', when moving from this state to the stable state of FIG. 1, departs from the state wherein it is being pressed with certainty against driving roll 1 and becomes supported by only rolls 4 and then at the instant it is to come in contact with rolls 5 to separate momentarily from the driving roll 1. At this instant, the transmission of power from the driving roll being weakened, the tension between the godet roller and the windup drum 2 would slacken to result frequently in the breakage of the yarn by the yarn being wrapped onto the godet roller. Thus, for preventing this, the provision of the roll arm 29 is desirable. The employment of this roll arm makes possible the movement from the positions of FIG. 8 to that of FIG. 1 to be carried out while maintaining very naturally the drum in the states desired. In this manner, a new drum 2' is established in the position of the windup drum 2 of FIG. 1 where it winds up the yarn until it becomes fully wound, after which the foregoing actions are repeated. Thus the switching of the yarn and exchange of drums can be carried out automatically, or even by manual operation, smoothly.

Further, in FIG. 1, if a stopper which defines the position of roll arms 29 is fitted on supporting arms 3, the drum receiving rolls 5 can be dispensed with and the rolls 33 can take their place. While the upwardly pressing force of rolls 33 would affect the surface pressure to some extent, this effect can be minimized by adjustment of the force of spring 34 by means of adjusting bolt 35. Or the surface pressure can be adjusted taking into consideration this effect.

Although a crank plate is used in the hereinbefore described apparatus for rocking the supporting arms, this may be accomplished by hydraulic or pneumatic means. Alternatively, a pedal or the like may be installed for carrying out this operation by foot. With respect to the matter of providing surface pressure, this also can be accomplished by a program controlling system by connecting all the spindles simultaneously or the several spindles separately to a hydraulic or pneumatic source.

In FIG. 9 is illustrated another embodiment of the windup drum supporting arms of the invention apparatus. Windup drum 2 whose periphery at both ends is supported by receiving rolls 4 and 5 is rotated by its surface being driven by the driving roll 1. As a result, yarn y is wound up while being caused to traverse reciprocatingly across the drum by means of traverse guide 7 to form a yarn layer y'

Main arms 3 for supporting the windup drum are mounted rotatably on shaft 9. 29 are the auxiliary arms which are pivotally mounted on shaft 30 provided in the main arms 3. Further, main arms 3 have stoppers 38 secured thereto by means of screws 39 and nuts 40. Thus, since the auxiliary arms 29 are supported on the main arms 3 at the two points consisting of stoppers 38 and shaft 30, they can be stabilized in a direction in which they are being pressed downwardly in such a position as indicated in FIG. 9. The position of stoppers 38 can be adjusted optionally by means of screws 39 and nuts 40. Whereas receiving rolls 5 are mounted on auxiliary arms by means of brackets 37, receiving rolls 4 are mounted on main arms 3 by means of brackets 36. Hence, receiving rolls 5 can move in accordance with the movement of auxiliary arms 29. The center of gravity of the auxiliary arm system inclusive of receiving rolls 5 is always located inwards of shaft 30 and auxiliary arms 29 always have a backwardly rotating moment (a counterclockwise moment in FIG. 9).

Further, main arms 3, which have been mounted on shaft 9, are provided at their other end with weights 8 and springs 43 thereby suitably adjusting by way of receiving rolls 4 and 5 the surface pressure between driving roll 1 and yarn layer y'.

The hereinabove described combination of a main arm an auxiliary arm must be provided in pairs disposed at the two ends of a windup drum.

41 are the pushup rods for pushing the auxiliary arms upwardly, these rods being so disposed that their tip is positioned right below the auxiliary arms 29. These pushup rods 41 are also adjustable by means of nut 42 to a suitable height. 45 is the pedal which is attached to main arms 3. Hence, when pedal 45 is depressed, not only are the main arms 3 pressed downwardly about shaft 9 but also the auxiliary arms 29 colliding with pushup rods 41 are pressed upwardly, with the consequence that the windup drum slides away from the receiving rolls. 31 is the windup drum receiver for receiving the drum which has been thus discharged.

The stages through which the drum passes in being discharged by an apparatus such as this will be described below with reference being had to FIG. 10.

In FIG. 10, that indicated with solid lines is a view illustrating the state prior to the discharge of the windup drum, while that indicated with dot-and-dash lines is a view illustrating the instance where pedal 45 having been depressed the main arms 3 have been pressed downwardly while the auxiliary arms 3 have been pushed upwardly by means of pushup rods 41.

Now, if pedal 45 is depressed, main arms 3 are pressed downwardly about shaft 9. At this time, auxiliary arms 29 also descend at the same time, but in their descent their underside surfaces collide with pushup rods 41 with the result that auxiliary arms 29 are pushed upwardly and turn about shaft 30. On the other hand, the windup drum 2 which had been supported by receiving rolls 4 and 5 now departs from driving roll 1 as a result of the movement of receiving rolls 5 and rotates about its point of support, the receiving rolls 4. When the center of gravity of the windup drum passes in this manner across the perpendicular line which passes through receiving rolls 4, the windup drum loses its stability and slides down forward to be caught by drum receiver 31. Thus, the windup drum can be removed from the winder merely by foot operation and moreover without damaging the wound yarn in the least.

Although the hereinabove apparatus is one in which the receiving rolls have been provided separately on the main as well as auxiliary arms, similar results can be had with one in which both rolls have been fitted on the auxiliary arms. As another modification, both of the receiving rolls may be fitted on the main arms, the embodiment being so adapted that when the main arms are depressed, the pushup rods collide either directly with the windup drum or through the medium of auxiliary arms to push out the windup drum. While the auxiliary arms in this case need not be provided with receiving rolls, the provision thereof is to be preferred.

That the operation of the pedal in discharging the windup drum can be that in which chain 44 shown in FIG. 9 is pulled by a hydraulic or pneumatic means is as previously described.

FIG. 11 is a side view of still another embodiment of the windup drum supporting arms of the apparatus, y being the yarn being delivered at a constant speed, 2, the windup drum for winding up this yarn; y', the yarn layer wound up and 7, the driving roll. At the two ends of windup drum supporting arms 3 are provided rotatable receiving rolls 4 and 5 which serve not only to support the end portions of drum 2 but also function to apply surface pressure. Windup drum supporting arms 3 are mounted on a prop 57 and remain fixed during the winding up operation. If the securing means (not shown) is released, the supporting arms 3 can freely turn about pin 59. For ensuring that the windup drum 2 does not move laterally, flanges may be provided at one end of drum receiving rolls 4 and 5. 58 is either a hydraulic cylinder or a spring by which prop 57 is provided the force to press windup drum 2 against driving roll 1 through the medium of windup drum supporting arms 3 and receiving rolls 4 and 5. Naturally, the windup drum supporting arms must be provided at both ends of the windup drum. In this case, for insuring identical movements by the arms at both ends, the arms preferably should be connected integrally, after which the surface pressure should be applied by means of a hydraulic cylinder or a spring.

Now, when the windup drum becomes full, the yarn, as previously described, is switched over to the empty drum which by now has attained its full preparatory rotation, then the full-wound drum 2, as a result of the prop 57 and supporting arms 3 being lowered by the action of hydraulic cylinder 58, is separated from driving roll 1 and dropped onto the drum receiver by inclining supporting arms 3. After having discharged the full-wound drum, supporting arms 3 return to below driving roll 1 and await the descent of a new windup drum.

FIGS. 12 to 17 illustrate another embodiment of the empty drum supporting arms of the apparatus. In FIGS. 12 and 13, the empty drum supporting arms consist of drum switching arms 18 and drum pushing-in arms 19. These arms are provided at their tips with receiving rolls 20 and 21, respectively. Of these two arms, the drum switching arms 18 being secured fast to a rotating shaft 22 rotate together with the latter. On the other hand, the drum pushing-in arms 19 are fitted rotatably on rotating shaft 22. As shown in FIGS. 14 to 17, switching arms 18 and pushing-in arms 19 are provided with lugs 50 and 51 at their bearing portions, which engage with each other to hold the arms such that their axes are about perpendicular to each other thereby limiting the range in which pushing-in arms 19 can rotate relative to switching arms 18 to a certain range (within angle $\theta$ in FIG. 16). Further, torsional coil springs 23 are mounted about the rotating shaft 22 with one of their ends being secured to collar 48 by means of screws 49, while their other ends are secured to the pushing-in arms 19, thus imparting to pushing-in arms 19 a force by which they are biased at all times towards switching arms 18. When drum 2', as shown in FIG. 12, is placed on top of receiving rolls 20 and 21 and the drum is pushed, pushing-in arms 19 can open to the extent of angle $\theta$. In this case, it is of course necessary to limit angle $\theta$ so that even though the arms are opened to a maximum degree the drum does not drop out. Stay 47 is for securing the two pushing-in arms 19 to ensure that they will work simultaneously.

Rotating shaft 22 is journaled in bearings 46 and is rotated by means of a motor or other sources of power. Thus, empty drum 2', being carried by the switching arms 18 and pushing-in arms 19 of such a means for effecting its preparatory rotation, is dropped onto a driving roll 1 to be given its preparatory rotation when the windup drum being wound up becomes full. Thereafter, the operations, as previously described, are carried out.

FIGS. 18 and 19 illustrate still another embodiment of the empty drum supporting arms of this invention. In these figures, switching arms 18 are secured fast to rotating shaft 22, whereas pushing-in arms 19 are fitted rotatably on said shaft. Further, pushing-in arms 19 are biased in a clockwise direction in FIG. 18 by means of torsional coil springs 23 whose one ends are secured to shaft 22 and other ends are secured to the pushing-in arms. The bearing portions of the two arms are provided with lugs such as shown in FIGS. 14 to 17 whereby the angle of opening of the arms is limited to a certain range.

Switching arms 19 are fitted with engaging arms 53 which are attached by means of pins 52 so as to be rotatable about the latter. Engaging arms 53 are provided with fingers 54 which are adapted to engage with pins 56 disposed at the other end 55 of pushing-in arms 19. Consequently, as is apparent from FIG. 18, the engaging arms 53 serve to hinder the tendency of the switching arms 18 and pushing-in arms 19 to close the angle between the arms. Thus, the distance between pin 52 of engaging arm 53 and finger 54 is determined in accordance with the angle to be prescribed between switching arms 18 and pushing-in arms 19. Hence, when the fingers of engaging arms 53 are in engagement with pins 56 of pushing-in arms 19, the angle between the two arms is maintained at the prescribed angle.

Now, when the windup drum becomes nearly full, rotating shaft 22 of the empty drum supporting arms carrying empty drum 2' starts to rotate (at this time, fingers 54 of engaging arms 53 are in engagement with pins 56 mounted at the other end 55 of pushing-in arms 19) and when empty drum 2' arrives at the position shown by the dot-and-dash line in FIG. 18, the rotation of rotating shaft 22 ceases for a while. Since the center of gravity of the windup drum with respect to receiving rolls 20 is, at this position, closer to shaft 22, windup drum 2' does not drop onto driving roll 1. After shaft 22 has stopped, engaging arms 53 are kicked up by, say, means of a magnet mounted on the frame thereby disengaging fingers 54 from pins 56. As a result, pushing-in arms 19 are drawn towards switching arms 18 by spring 23 to push windup drum 2' out against driving roll 1 where the drum being pressed by means of receiving rolls 21 at the tips of pushing-in arms 19 against driving roll 1 starts its preparatory rotation.

Thus, since according to this embodiment the position at which the empty drum makes its preparatory rotation can be established at a fixed location, the traverse guide 7 can be placed in a considerably closer location to drum 1. In consequence, the free lengths of the yarn can be shortened. The shape of the thus obtained yarn is highly satisfactory.

Although the operations such as the rocking of the empty drum supporting arms for effecting the preparatory rotation of the empty drum, the operation of the yarn switching means, and the rocking of the windup drum supporting arms for discharging the full-wound drum and thereafter supporting the new windup drum in its proper winding up position can be by means of foot operation or like, the accomplishment of these operations automatically in accordance with a program is to be preferred.

The apparatus of the invention is applicable to all those operations where a fibrous substance is wound up on drum or the like. The effects, when compared with the conventional winder, are significantly great even when the most simple form of the centerless winder is used (that is to say, by the use of a winder having at least two drum receiving rolls and windup drum supporting arms capable of receiprocative movements in the direction of a driving roll, characterized in that a yarnlike substance is wound up by said drum receiving rolls pressing a windup drum against the driving roll with a suitable surface pressure).

Namely, since the mounting and ejection operation of a windup drum is possible by means of the movement of the windup arms in only one direction according to the centerless winder of this invention, the effects manifested are great in those cases of a small interval between adjoining winders whose gauge is small.

In addition, because of the fact that the windup drum is held by a centerless method, such a phenomenon as that in which the windup drum cannot be removed from the winder, as in the case of the conventional winders, even in those instances in which the windup drum has been distorted by having been subjected to a great binding force due to the tension of the yarn disappears, thus making it possible to use low cost materials such as paper for the windup drum. Furthermore, when a yarn switching mechanism, means for imparting preparatory rotation to said drum and means for effecting the ejection of the windup drum is added, as described herein, then since there will be no need for the workers to touch the members involved in the preparatory rotation, switching and ejection operations directly, the operations become perfectly safe even when operating at high speeds. In addition, according to the present apparatus, a decline in productive efficiency does not occur as a result of the foregoing operations. Further, by operating the present apparatus automatically it becomes possible to effect a reduction in labor requirements as well as to simplify the control for effecting a leveling out in the differences in the quantity of yarn wound on the several drums.

What we claim is:

1. A yarn drum winder comprising a driving roll for surface driving a windup drum, windup drum supporting arms having at least two drum receiving rolls thereon and being reciprocally movable toward and away from said driving roll, said drum receiving rolls supporting the end portions of a windup drum for engagement by said driving roll, empty drum supporting arms adjacent and above said winding drum supporting arms and having at one end thereof receiving rolls for supporting an empty drum, said empty drum supporting arms being oscillatable toward and away from said driving roll to move an empty drum into engagement with the driving roll to effect preparatory rotation of the empty drum prior to the time the yarn becomes fully wound up on a windup drum and to further release it to fall onto the windup drum supporting arms, and a yarn switching means adjacent said driving roll means for switching the yarn from a full-wound drum to an empty drum while both drums are being driven, and means coupled to said windup drum supporting arms for moving said arms to move the full-wound drum out of engagement with the driving roll and discharge the full-wound drum after yarn switching and returning the said arms to their initial position to support the new windup drum.

2. A yarn drum winder as claimed in claim 1 wherein said windup drum supporting arms have said at least two drum receiving rolls for supporting the end portions of a windup drum at one end thereof, said arms being mounted for oscillation about a fulcrum point.

3. A yarn drum winder as claimed in claim 1 wherein said windup drum supporting arms have said at least two drum receiving rolls for supporting the end portions of a windup drum at one end thereof, and an ascending and descending means on which said windup driven drum supporting arms are mounted and being capable of movements in a vertical direction.

4. A yarn drum winder as claimed in claim 1 wherein said windup drum supporting arms have the said receiving rolls supporting the end portions of a windup drum at one end thereof, said windup drum supporting arms comprising main arms which are mounted for oscillation about a fulcrum point, means coupled to said main arms for regulating the surface pressure between the driving roll and a windup drum supported on said windup drum supporting arms, and auxiliary arms having receiving rolls at the free ends thereof, said auxiliary arms being pivotally mounted on said windup drum supporting arms, and means engageable with said auxiliary arms so that when said windup drum supporting arms descend, said auxiliary arms pivot and eject the full-wound drum which said supporting arms had been supporting.

5. A yarn drum winder as claimed in claim 1 wherein said empty drum supporting arms comprise pushing-in arms and switching arms, a rotatable shaft on which said pushing-in arms are rotatably mounted and said switching arms are fixedly secured for pivotal movement with said rotating shaft, both of said arms having the said receiving rolls at their free ends, force applying means coupled to said pushing-in arms and imparting thereto a pulling force by which said pushing-in arms are biased towards said switching arms at all times, whereby the empty drum supported by said supporting arms is adapted to be pressed against the driving roll by said pushing-in arms as said switching arms are rotated as a result of the rotation of said rotating shaft.

6. A yarn drum winder as claimed in claim 5 wherein said pushing-in arms have projecting pins at the ends thereof opposite the ends having the receiving rolls thereon and said switching arms have engaging arms provided with fingers to engage with said projecting pins of the pushing-in arms, whereby the tendency of said two arms to close the angle between them is blocked and this angle is normally maintained constant.

References Cited

UNITED STATES PATENTS

| 2,736,508 | 2/1956 | Langbo | 242—56 |
| 2,849,191 | 8/1958 | Gadler | 242—56 |
| 2,989,262 | 6/1961 | Hornbostel | 242—66 X |

FOREIGN PATENTS

| 721,951 | 1/1955 | Great Britain. |
| 768,059 | 2/1957 | Great Britain. |
| 255,586 | 10/1927 | Italy. |

WILLIAM S. BURDEN, *Primary Examiner.*